Nov. 15, 1966 J. M. FIELD ET AL 3,286,038

INTERCOMMUNICATION SYSTEM WITH DIAL SELECTED RINGING

Filed June 26, 1963 2 Sheets-Sheet 1

INVENTORS J. M. FIELD
T. P. NENNINGER
D. H. SCHOLES

BY E J Olinder

ATTORNEY

United States Patent Office 3,286,038
Patented Nov. 15, 1966

3,286,038

INTERCOMMUNICATION SYSTEM WITH DIAL SELECTED RINGING

James M. Field, New Shrewsbury, and Theodore P. Nenninger, East Brunswick, N.J., and David H. Scholes, Willowdale, Ontario, Canada, assignors to Bell Telephone Laboratories, Incorporated, New York, N.Y., a corporation of New York Filed June 26, 1963, Ser. No. 290,675
9 Claims. (Cl. 179—40)

This invention relates to combined intercommunication and telephone systems and more particularly to such systems employing dial selected ringing among stations on the intercommunication circuit.

A variety of communication systems are known which provide intercommunication facilities among a plurality of individual stations at a substantially common location as well as normal telephone service for each of the individual stations. Arrangements of this type typically include one or more master stations and one or more subordinate or slave stations. Generally, local wiring, signaling and switching equipment enables each master station to call any other master station as well as any slave station. Slave stations normally include no calling or control facilities and outside telephone service is provided only for master stations.

Systems of the general type indicated may be employed advantageously in large homes, for example, where a number of telephone extensions are used and where door answering units may conveniently be included as slave stations. Employment of systems of this type is also desirable in small business establishment where communication volume is not sufficient to warrant the installation of private branch exchanges. Despite the attractive communication convenience features afforded by combination intercom-telephone systems, commercial use has not been widespread. Known systems which provide a full combination of the most desirable features require a substantial increase in interstation wiring and the installation of common equipment which is disproportionately complex with respect to the services provided. As a result, the high cost of such installations has been a significant factor in limiting their use.

Accordingly, a general object of the invention is to simplify systems which provide a combination of intercommunication facilities and normal telephone service.

Another object of the invention is to reduce the cost of such systems.

A further object of the invention is to enhance the flexibility and versatility of such systems without a corresponding increase in circuit or equipment complexity.

These and other objects are achieved in accordance with the principles of the invention by an intercom-telephone system which provides, by way of a two-wire system, for dial-selected connection and signaling among a plurality of master stations, each including a conventional telephone handset. Communication with hands-free slave stations which do not have a central office line appearance is provided by a network of three conductor connections. In accordance with the invention, each master station is equipped with a three-position manual mode selector switch which may be set for normal telephone use, for intercommunication use, or for holding a central office line while a particular extension is being dialed on the intercom circuit. The use of any telephone sets or slave stations on the intercom line does not "busy out" the central office line to incoming calls.

In accordance with the invention, slave stations may be dialed in the normal way from any master station, i.e., by the dialing of a single digit, but slave stations cannot originate calls. The dialing of a slave station from a master station is solely for selection and connection purposes, rather than signaling, and consequently only a single slave station may be communicated with at any one time.

The principles of the invention call for the employment of a unique combination of common equipment for the master stations, which equipment includes a two-level line selector switch operated in step-by-step fashion in response to the generation of dial pulses. Lines to master stations are terminated on one level of the selector switch and slave stations are terminated on the second level, thereby maintaining separate communication paths for the two types of circuits. The common equipment for the master stations also includes a transistor oscillator for signaling purposes and transistor logic circuitry which controls the operating sequence when an intercommunication call is initiated. Comparable common equipment is provided for the slave stations.

Accordingly, one feature of the invention pertains to an intercommunication circuit dialing arrangement wherein any master station can be selectively signaled from and connected to any other master station by dialing a single digit and wherein any slave station can be selectively connected to any master station, without signaling, by the dialing of a single digit.

Another feature of the invention resides in transistor-controlled common equipment for the interconnection of master stations including a transistor oscillator adapted to generate a single tone burst in response to the generation of a train of dial pulses corresponding to the dialing of a single digit.

A further feature of the invention is a switching arrangement ensuring the uninterrupted availability of the normal telephone ringer to the central office so that irrespective of other uses, incoming calls are not "busied out."

An additional feature is a switching arrangement ensuring the continuous availability of intercom tone ringing means whether or not the corresponding called station is using its central office line.

These and other objects and features will be fully apprehended by reference to the following detailed description of an illustrative embodiment of the invention and to the appended drawing in which.

Figures 1, 3:
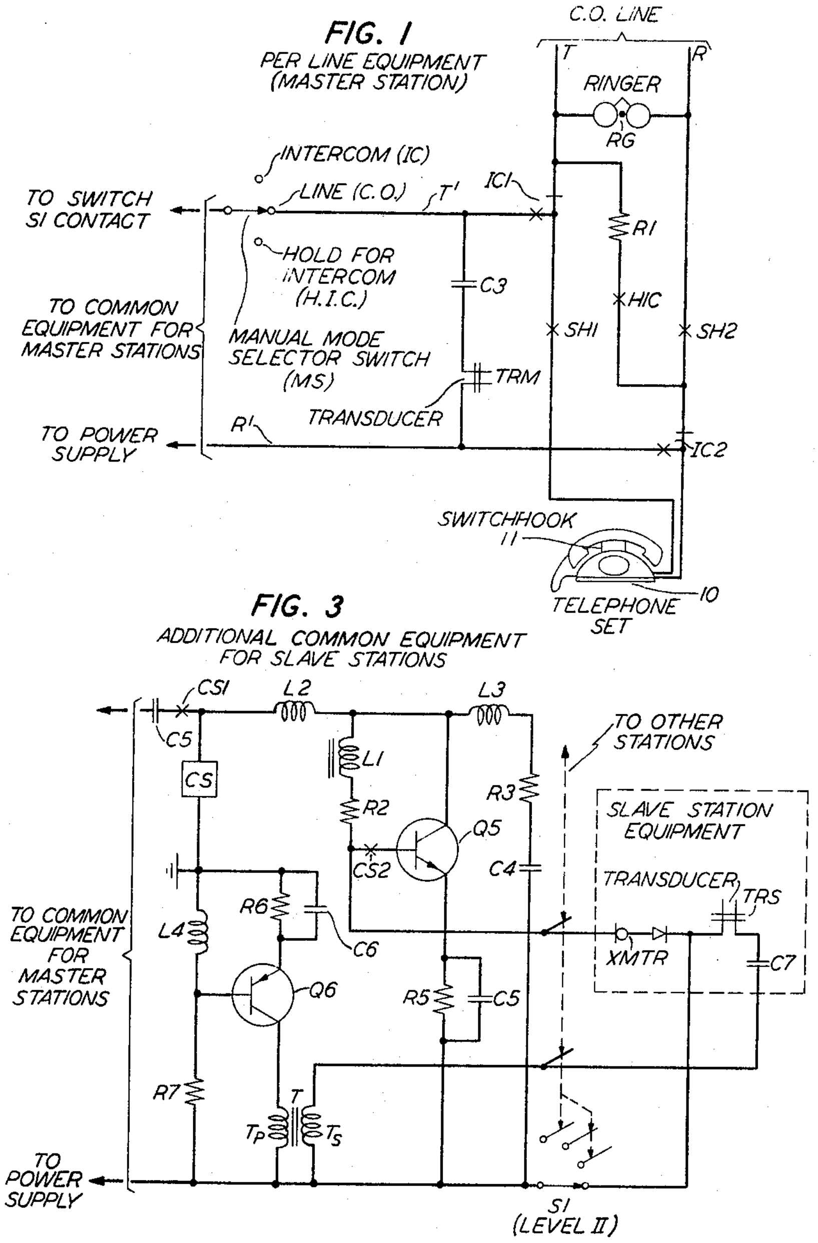
FIG. 1 is a schematic circuit diagram of a master station in a communication system in accordance with the invention.
FIG. 3 is a schematic circuit diagram of a single slave station and of the common equipment employed for a plurality of slave stations.

In FIG. 1 a telephone set 10 is conventionally bridged across central office lines T and R. Conventional station set wiring has been modified, however, in accordance with the principles of the invention, by taking both of the T and R leads through contacts of the three position manual mode selector switch MS in such a fashion that the ringer RG is always available to the central office. Consequently, irrespective of whether the intercommunication circuits are in use, normal incoming telephone calls are not "busied out." With mode selector switch MS in the intercom position (IC), make and break contacts IC1 and make and break contacts IC2 are operated which bridges telephone set 10 across leads T′ and R′ which connect to the common equipment shown in FIG. 2. Switchhook contact SH1 completes the loop for the intercom circuit and both switchhook contacts SH1 and SH2 complete the central office loop for normal telephone service. Transducer TRM, which may be a conventional tone ringer for example, is bridged across leads T′ and R′ in series with capacitor C3 to provide a means for the receipt of an intercom signal generated by the common equipment for master stations shown in FIG. 2. During conversion between any two stations, each of the transducers TRM is bridged across the line and accordingly both alternating and direct current isolation are required. The series capacitor C3 serves to block the direct current path and diodes D1 through D4 (FIG. 2) block most of the alternating current except for scans in the forward direction.

With mode selector switch MS in the central office line position (C.O.), leads T' and R' are open at unoperated make contacts IC1 and IC2 and the station is thereby aligned for normal telephone use. In the "Hold for Intercom" position (H.I.C.), make contact HIC is operated, shunting resistor R1 across leads T and R. By this means the central office line may be held while a particular extension is being dialed on one of the intercom circuits.

Figure 2:
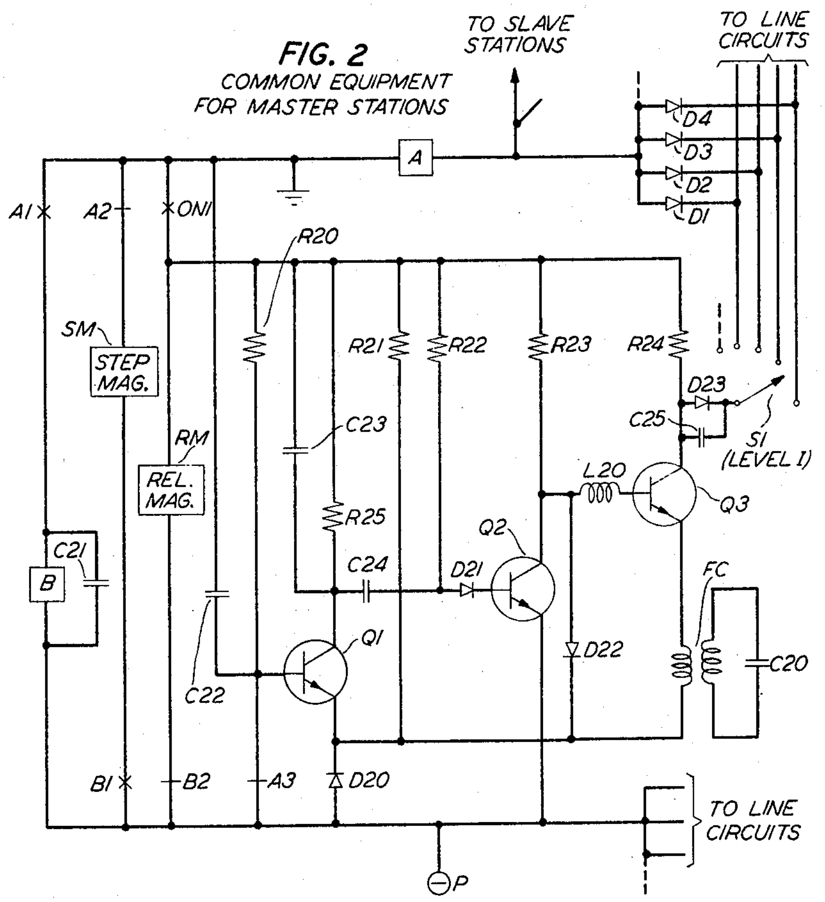
FIG. 2 is a schematic circuit diagram of the common equipment for a group of master stations of the type shown in FIG. 2.

As shown in FIG. 2, the ringing paths of stations which are not in use are isolated from the talking path by means of the diodes D1 through D4. Upon removal of the handset from telephone set 10 (FIG. 1), manual mode selector switch MS being in the intercom position, an operating path for relay A is completed by the operation of make switchhook contact SH1. With the operation of relay A, a path to ground is closed through make contact A1, causing relay B to operate. Relay B has slow release characteristics because of shunting capacitor C21. Consequently, when digits are dialed, relay B does not follow the dial pulses as does relay A. After the dialing of another master station is completed at telephone set 10 (FIG. 1), both relays A and B remain operated until both handsets are restored. Each pulsed release of relay A operates break contact A2, causing step magnet SM to advance one digit since relay B is still operated. Only when relay B releases does release magnet RM of selector switch S1 operate to restore the selector contacts of selector switch S1 to the "normal" position. This action occurs when all handsets are replaced on hook.

The common equipment shown in FIG. 2 includes a tone ringer oscillator circuit which comprises transistor Q3, resistors R23 and R24, diode D22, transformer FC, and capacitor C20. The frequency of oscillation is established by the inductance magnitude of the coils of transformer FC and the capacitance magnitude of capacitor C20. Transistor Q2, together with its biasing resistors R22 and R23 and the protective diode D21 is employed to turn off transistor Q3 by lowering its base potential below the potential level of the emitter. Capacitor C24, which charges up once selector switch S1 goes off normal, provided that transistor Q1 is nonconducting, controls the length of the tone burst from the oscillator circuit described above by discharging through the resistor R22. Upon the discharge of capacitor C24, transistor Q2 is turned on and hence transistor Q3 is turned off. Transistor Q1, in combination with biasing resistors R20 and R25 and protective diode D20, is employed to ensure that so long as dial pulses are being transmitted, with the operation of relay A following each pulse, capacitor C24 cannot charge and consequently the tone burst does not start until completion of dialing. The time interval between the completion of dialing and the inception of tone generation is established by the timing network comprising capacitor C24 and resistor R25. By this means the ring or tone burst signal of a common duration is made available to all dialed stations.

When an intercom call is answered, tone is removed from the line. Such removal is achieved by means of a path through diode D22 by way of which path the potential from power supply P is applied to the collector of transistor Q2 as soon as the called station goes off hook. The application of the voltage described to the collector of transistor Q2 turns transistor Q2 on, which as indicated above turns oscillator-transistor Q3 off.

In accordance with the invention all slave stations are assigned extension numbers between zero and nine which have not already been assigned to master stations.

As shown in FIG. 3, slave stations are connected to the second level of selector switch S1 inasmuch as such stations are designed not to communicate with each other and can only be reached by being called by a master station. Additionally, it will be noted that no ringers are required as a part of slave station equipment and accordingly the common equipment shown in FIG. 3 is required primarily for the purpose of amplification. Dial selection of a slave station causes the closing of both the transmitter and receiver circuits. Relay CS is operated by relay A, closing a path through the hybrid, the inductor L1 and the called transmitter. It is only when relay CS has operated that amplifying transistor Q5 is turned on. Relay C also closes an alternating current talking path back to the common side of relay A by the operation of make contact CS1, and thence to the calling station. Inductor L1 serves as a choke which prevents excessive negative feedback of transmit power. At the same time, as the transmitting circuit is completed, the slave station receiver TRS is also brought into the circuit. Its path is through the matching transformer T and transistor Q6. The actual winding L4 of the hybrid connects the sidetone network of the audio input to the amplifier.

It is to be understood that the circuits described herein are merely illustrative of the principles of the invention. Various modifications may be effected by persons skilled in the art without departing from the spirit and scope of the invention.

What is claimed is:

1. An intercommunicating telephone system comprising a plurality of master stations each including a respective telephone set having dial pulse generating means; switch means for selectively aligning the system for intercommunication between local stations, for intercommunication between local stations only, or for normal connection through a central office or for intercommunication between local stations while lines to the central office are maintained in a hold condition; first common means responsive to the dialing of a single digit from one of said dial pulse generating means for signaling a preselected one of said stations; said common means including a two-level stepping switch having contacts corresponding to said master stations on one of said levels, a transistor oscillator for generating a station alerting signal, means operative only after the termination of the generation of a set of dial pulses corresponding to a single dialed digit for initiating the operation of said oscillator, means including said stepping switch for applying a signal from said oscillator to that one of said stations corresponding to the digit dialed thereby to generate an audible alerting signal at said last named station; a plurality of slave stations, and second common means including said stepping switch responsive to the dialing of a single digit from one of said dial pulse generating means for completing a connection between one of said master stations and a preselected one of said slave stations, said stepping switch having contacts on the other one of said levels corresponding to said master station.

2. Apparatus in accordance with claim 1 wherein said operative means includes a transistor switch and a timing network in circuit therewith maintaining an OFF bias on said transistor oscillator during the generation of dial pulses at one of said master stations.

3. Apparatus in accordance with claim 1 wherein said second common means includes amplifying means.

4. Apparatus in accordance with claim 1 wherein each of said master stations includes a conventional ringer responsive to central office ringing signals and an electroacoustic transducer responsive to signals from said oscillator.

5. An intercommunicating telephone system comprising a plurality of master stations and a plurality of slave stations, first common means including a two-level stepping switch responsive to the dialing of a single digit from one of said master stations for signaling a preselected other one of said master stations, and second common means including said switch responsive to the dialing of a single digit from one of said master stations for completing a talking path connection between said last named master station and a preselected one of said slave stations, said switch including a first set of contacts on one of said levels corresponding to said master stations and a second set of contacts on the other of said levels corresponding to said slave stations thereby maintaining separation between slave station and master station signaling and talking paths, said first common means including a transistor oscillator for said signaling and said second common means including means for amplifying voice signals between one of said master stations and one of said slave stations.

6. An intercommunicating telephone system comprising a plurality of master stations each including a respective telephone set and a plurality of slave stations, first common means including a two level stepping switch responsive to the dialing of a single digit from one of said master stations for signaling a preselected other one of said master stations, said common means further including a first relay operatively responsive to each dial pulse from one of said master stations, a stepping magnet operatively responsive to each operation of said first relay, said switch being moved in an incremental step in response to each operation of said stepping magnet, a second relay operatively responsive to the initial operation of said first relay, said second relay having slow release characteristics whereby said second relay remains operated during the successive operations of said first relay in response to a set of dial pulses corresponding to a single dialed digit; means including a release magnet, and a set of contacts of said second relay operative upon the release of said second relay occurring at the termination of the generation of a set of single digit dial pulses for returning said switch to a neutral position provided that said telephone set at said one master station and said telephone set at said other master station have been returned to the on-hook condition, and second common means including said two level stepping switch responsive to the dialing of a single digit from one of said master stations for completing a talking path connection between said last named master station and a preselected one of said slave stations.

7. Apparatus in accordance with claim 6 wherein said first common means includes a transistor oscillator for generating an alerting signal for a called one of said stations and means for initiating the operation of said oscillator for a fixed preselcted period only after said switch has been stepped to a position corresponding to a called one of said master stations.

8. Apparatus in accordance with claim 7 wherein said last named means includes a transistor switch in circuit combination with a timing network.

9. Apparatus in accordance with claim 7 wherein said second common means includes means for amplifying voice transmission between one of said master stations and one of said slave stations.

References Cited by the Examiner

UNITED STATES PATENTS

| | | | |
|---|---|---|---|
| 3,014,097 | 12/1961 | Apt | 179—84 |
| 3,055,985 | 9/1962 | Peterson | 179—99 X |
| 3,089,000 | 5/1963 | Burgener | 179—84 X |

KATHLEEN H. CLAFFY, *Primary Examiner.*

L. A. WRIGHT, *Assistant Examiner.*